United States Patent
Allen, Jr.

(10) Patent No.: US 6,484,035 B2
(45) Date of Patent: Nov. 19, 2002

(54) APPARATUS AND METHOD FOR TRIGGERABLE LOCATION REPORTING

(75) Inventor: Alvin C. Allen, Jr., Liberty, TX (US)

(73) Assignee: LunarEYE, Inc., Liberty, TX (US)

(*) Notice: Subject to any disclaimer, the term of this patent is extended or adjusted under 35 U.S.C. 154(b) by 0 days.

(21) Appl. No.: 10/008,893

(22) Filed: Nov. 13, 2001

(65) Prior Publication Data

US 2002/0042280 A1 Apr. 11, 2002

Related U.S. Application Data

(63) Continuation of application No. 09/206,627, filed on Dec. 7, 1998.

(51) Int. Cl.[7] .................. H04Q 7/20; H04B 7/185; G01S 3/02
(52) U.S. Cl. .............. 455/456; 455/12.1; 455/517; 342/357.1; 342/357.07; 342/457; 340/825.49; 340/988
(58) Field of Search ................. 455/456, 404, 455/12.1, 13.1, 13.2, 422, 427, 458, 517, 521; 342/42, 50, 57, 357.06, 357.1, 357.07, 357.01, 450, 457; 340/572.1, 10.1, 825.36, 825.49, 988

(56) References Cited

U.S. PATENT DOCUMENTS

| | | | | |
|---|---|---|---|---|
| 4,651,157 A | | 3/1987 | Gray et al. | .................. 342/457 |
| 4,688,244 A | | 8/1987 | Hannon et al. | ................ 377/58 |
| 4,750,197 A | | 6/1988 | Denekamp et al. | .......... 488/404 |
| 5,223,844 A | * | 6/1993 | Mansell et al. | ......... 342/357.07 |

(List continued on next page.)

FOREIGN PATENT DOCUMENTS

| | | | | |
|---|---|---|---|---|
| DE | 19733579 | 2/1999 | ........... G08B/25/10 |
| EP | 0 242 099 | 10/1987 | .............. G01S/5/14 |
| EP | 0421704 | 4/1991 | ............. G01S/5/00 |
| EP | 0748727 | 12/1996 | ........... B60R/26/10 |
| EP | 0799753 | 10/1997 | ........... B60R/25/04 |
| FR | 2718532 | 10/1995 | ............. G01S/1/02 |
| GB | 2271486 | 4/1994 | ............. H04B/7/26 |
| GB | 2274188 | 7/1994 | ........... G08B/13/00 |
| GB | 2279478 | 1/1995 | ........... B60R/25/10 |
| JP | 06-85727 | 3/1994 | ............. H04B/7/26 |
| JP | 06-308218 | 11/1994 | ............. G01S/5/14 |
| JP | 409200855 | 7/1997 | ............. H04Q/7/38 |
| JP | 410307879 | 7/1997 | ........... G06F/17/60 |
| JP | 410096765 | 4/1998 | ........... G06F/17/60 |
| JP | 410307879 | 11/1998 | ........... G06F/17/60 |
| WO | WO 95/13943 | 5/1995 | ........... H04B/7/198 |
| WO | WO 95/17686 | 6/1995 | ............. G01S/5/10 |
| WO | WO 96/12264 | 4/1996 | .......... G08G/1/127 |
| WO | WO 96/26614 | 8/1996 | ............. H04Q/1/30 |
| WO | WO 96/09941 | 7/1997 | ........... B60R/11/02 |
| WO | WO 98/00988 | 1/1998 | ............. H04Q/7/22 |
| WO | WO 98/01769 | 1/1998 | ............. G01S/5/14 |
| WO | WO 98/08314 | 2/1998 | ........... H04B/7/185 |
| WO | WO 98/12862 | 3/1998 | .......... H04M/11/00 |
| WO | 00/34798 | * | 6/2000 | |
| WO | WO 00/44185 | 7/2000 | ............. H04Q/7/22 |

OTHER PUBLICATIONS

Cellemetry, http://www.cellemetry.com/html/techoverview.html, "Measurement Alarm Monitoring Remote Control Location/GPS", Technical Overview, Jan. 1999, p. 1.

Cellemetry, http://www.cellemetry.com/html/systemdes.html, "Measurement AlarM Monitoring Remote Control Location/GPS", System Description, Oct. 1998, pp. 1–3.

(List continued on next page.)

Primary Examiner—Lee Nguyen
Assistant Examiner—Rafael Perez-Gutierrez
(74) Attorney, Agent, or Firm—Baker Botts, L.L.P.

(57) ABSTRACT

A triggerable location-reporting apparatus is disclosed. A trigger signal from a page receiver triggers a GPS receiver to determine the location of the apparatus using GPS signals. The resulting GPS signal is transmitted by a telemetry transmitter, such as a cellular network telemetry transmitter.

3 Claims, 10 Drawing Sheets

U.S. PATENT DOCUMENTS

| | | | |
|---|---|---|---|
| 5,334,974 A | | 8/1994 | Simms et al. ............... 340/990 |
| 5,396,540 A | | 3/1995 | Gooch ........................ 455/456 |
| 5,418,537 A | | 5/1995 | Bird ..................... 342/357.09 |
| 5,422,813 A | | 6/1995 | Schuchman et al. ......... 455/440 |
| 5,479,482 A | | 12/1995 | Grimes ....................... 455/556 |
| 5,490,200 A | * | 2/1996 | Snyder et al. ............... 340/7.1 |
| 5,497,149 A | | 3/1996 | Fast ........................... 340/988 |
| 5,515,043 A | | 5/1996 | Berard et al. ............... 340/988 |
| 5,539,810 A | | 7/1996 | Kennedy, III et al. ... 379/88.25 |
| 5,544,225 A | | 8/1996 | Kennedy, III et al. ...... 455/412 |
| 5,546,444 A | | 8/1996 | Roach, Jr. et al. .......... 455/412 |
| 5,555,286 A | * | 9/1996 | Tendler ....................... 455/404 |
| 5,572,204 A | | 11/1996 | Timm et al. ................ 340/988 |
| 5,588,038 A | * | 12/1996 | Snyder ...................... 455/12.1 |
| 5,629,693 A | | 5/1997 | Janky ......................... 340/988 |
| 5,640,139 A | | 6/1997 | Egeberg ..................... 340/426 |
| 5,652,570 A | | 7/1997 | Lepkofker ............... 340/573.4 |
| 5,673,305 A | * | 9/1997 | Ross ..................... 342/357.07 |
| 5,682,133 A | | 10/1997 | Johnson et al. ............. 340/426 |
| 5,736,962 A | | 4/1998 | Tendler ................... 342/357.1 |
| 5,742,233 A | | 4/1998 | Hoffman et al. ......... 340/573.1 |
| 5,742,509 A | | 4/1998 | Goldberg et al. ........... 701/211 |
| 5,751,246 A | | 5/1998 | Hertel .................... 342/357.07 |
| 5,760,742 A | | 6/1998 | Branch et al. .............. 342/457 |
| 5,771,455 A | | 6/1998 | Kennedy, III et al. ...... 455/456 |
| 5,777,580 A | * | 7/1998 | Janky et al. ................ 342/457 |
| 5,786,789 A | | 7/1998 | Janky ..................... 342/357.1 |
| 5,794,174 A | | 8/1998 | Janky et al. ................ 701/207 |
| 5,797,134 A | | 8/1998 | McMillan et al. .......... 705/400 |
| 5,808,564 A | | 9/1998 | Simms et al. ............... 340/990 |
| 5,811,886 A | | 9/1998 | Majmudar ................ 307/10.2 |
| 5,825,327 A | | 10/1998 | Krasner ................. 342/357.09 |
| 5,826,195 A | * | 10/1998 | Westerlage et al. ......... 455/456 |
| 5,838,237 A | | 11/1998 | Revell et al. ............ 340/573.1 |
| 5,845,203 A | | 12/1998 | LaDue ....................... 455/414 |
| 5,873,043 A | | 2/1999 | Comer ....................... 455/468 |
| 5,898,391 A | | 4/1999 | Jefferies et al. ............. 340/988 |
| 5,914,675 A | | 6/1999 | Tognazzini ................ 340/989 |
| 5,917,405 A | | 6/1999 | Joao ........................... 340/426 |
| 5,918,172 A | | 6/1999 | Saunders et al. ........... 455/404 |
| 5,926,086 A | | 7/1999 | Escareno et al. ........... 340/426 |
| 5,929,752 A | | 7/1999 | Janky et al. ................ 340/426 |
| 5,930,713 A | | 7/1999 | Nguyen ...................... 485/440 |
| 5,933,100 A | | 8/1999 | Golding ...................... 340/995 |
| 5,939,975 A | | 8/1999 | Tsuria et al. ................ 340/426 |
| 5,940,004 A | | 8/1999 | Fulton ................... 340/825.49 |
| 5,973,618 A | | 10/1999 | Ellis ........................... 340/990 |
| 6,054,928 A | * | 4/2000 | Lemelson et al. ........ 340/573.4 |
| 6,069,570 A | | 5/2000 | Herring ................. 340/825.49 |
| 6,240,295 B1 | | 5/2000 | Kennedy, III et al. ....... 455/456 |
| 6,297,768 B1 | * | 10/2001 | Allen, Jr. .................. 342/357.1 |
| 2002/0018014 A1 | * | 2/2002 | Allen, Jr. ............... 342/357.07 |
| 2002/0042280 A1 | * | 4/2002 | Allen, Jr. .................... 455/456 |

OTHER PUBLICATIONS

Cellemetry, http://www.cellemetry.com/html/glossory.html, "Measurement AlarM Monitoring Remote Control Location/GPS", Glossary, 1998, pp. 1–2.

Motorola, "GT Plus Oncore, GPS Receiver", Sep. 1, 1998.

Motorola, "SL Oncore, GPS Receiver", Apr. 3, 1998.

Motorola, "Oncore, Evaluation Kits", Apr. 3, 1998.

Motorola, "RF Oncore, GPS Module", Sep. 1, 1998.

Motorola, "Oncore, GPS ChipSet", Apr. 3, 1998.

Motorola, Semiconductor Technical Data, "GPS Digital Correlator", 1997, pp. 1–10.

Motorola, Semiconduct Technical Data, "Integrated GPS Downconverter", 1997.

Motorola, "New Chip Enables Paging To Industrial Equipment", Aug. 31, 1998, pp. 1–3.

Motorola, "M–CORE Processor Architecture", 1998, p. 1.

SAT–TRAX, http://www.sat–trax.com/news.htm, "Sat–Trax International Locates Stolen Vehicles by Computer Through GPS Satellite and Cellular Link", Aug. 1, 1998, pp. 1–2.

Standard Communications, "CRM4100 Cellular Radio Module for AMPS", Oct. 8, 1997, pp. 1–7.

Hassell, Greg, "Cheap insurance comes at a price." The Houston Chronicle, Section C, Nov. 3, 1999.

* cited by examiner

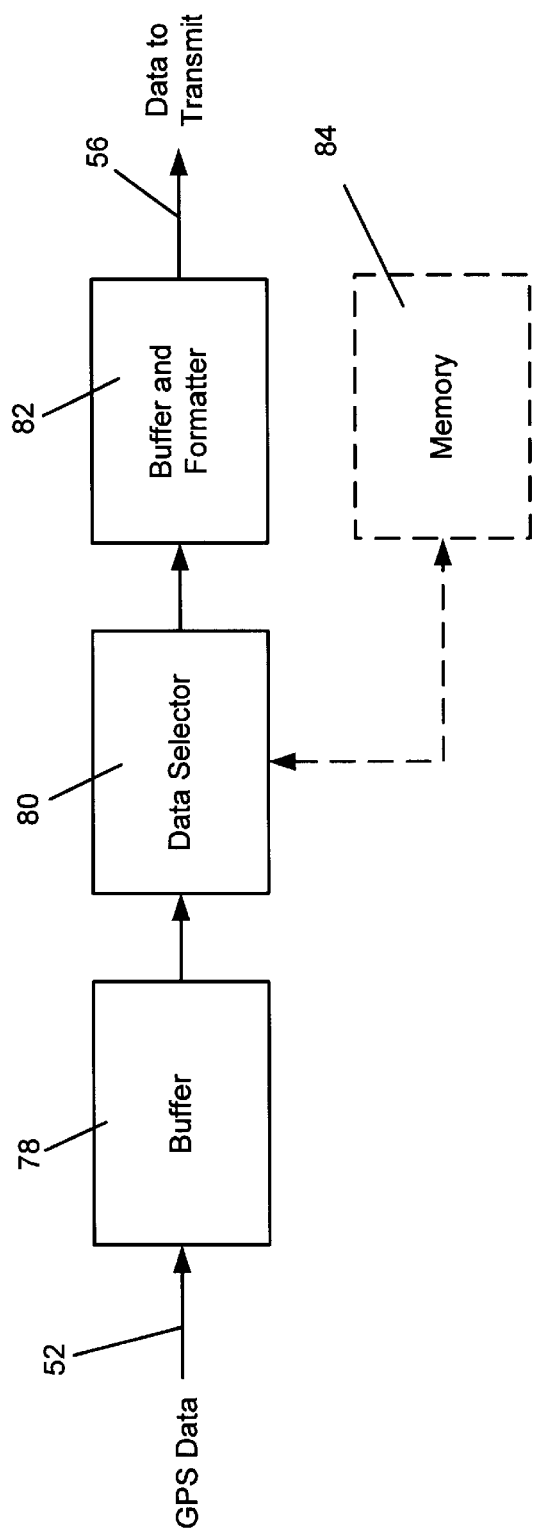

APPARATUS AND METHOD FOR TRIGGERABLE LOCATION REPORTING

This is a continuation of U.S. patent application Ser. No. 09/206,627 filed Dec. 7, 1998.

FIELD OF THE INVENTION

This invention relates generally to location reporting apparatus and methods. More particularly, this invention relates to location reporting apparatus and methods that use the Global Positioning Satellite System ("GPS") to ascertain an object's location. Even more particularly, this invention relates to location reporting apparatus and methods that are triggerable and that report their location derived from GPS signals, via telemetry.

BACKGROUND OF THE INVENTION

Frequently, people use credit to purchase consumer items, such as automobiles, televisions or computers. The purchasers take possession of the item and take it to their homes or offices and put them into use. They are responsible for making periodic payments to the creditor, the person or entity that extended the credit, to pay off the loan. The creditor retains a lien on the property and is also known as a "lien-holder".

In today's mobile society, people frequently move from one location to another. When they move, they typically take their possessions, including those possessions covered by a lien held by the lien-holder. Sometimes when they move they stop making their periodic payments to the lien-holder, perhaps believing that they no longer have to make payments and that the lien-holder will not be able to locate them.

Further, some people simply move a possession, such as an automobile, covered by a lien, in order to hide it from the lien-holder when they stop making payments.

In either case, the lien-holder is faced with having to locate and take possession of the item covered by the lien. At times, such a process can be expensive, time consuming, and even dangerous, requiring the lien-holder to hire investigators to locate the debtor and, hopefully, the item covered by the lien.

Stolen items present a similar challenge. In the case of automobiles, thieves can steal a car, take it to a "chop shop", or a specially outfitted body shop where the automobile is dismantled into salable parts in just a few hours. The traditional response to an automobile theft is to report the theft to the police who then do their best to find the automobile before it is dismantled.

Other consumer items can be dismantled or otherwise placed into an underground market within just a few hours of their theft. Alternatively, such items can be removed to the thief's home, where they are hidden from the eyes of the police or other investigators.

Even people are subject to being "stolen", or kidnapped. Again, the traditional response is to report a missing person to the police and other law enforcement agencies who then conduct a search for the missing person.

SUMMARY OF THE INVENTION

Upon receipt of a page or the occurrence of another triggering action, the invention determines its location using GPS signals and reports the location via cellular or satellite telemetry. The telemetry is routed to a service provider, which takes an appropriate action, such as informing the lien-holder of the location of the object covered by the lien.

In general, in one aspect, the invention features a triggerable location-reporting apparatus comprising a trigger signal, a GPS processor coupled to the trigger signal, a position signal carrying position information generated by the GPS processor in response to the trigger signal, a telemetry transmitter coupled to the position signal, and a telemetry transmit signal transmitted by the telemetry transmitter, the telemetry transmit signal carrying the position information.

Implementations of the invention may include one or more of the following. The apparatus may include a power supply connection, a first switchable power signal coupled to the GPS processor and the power supply connection, and a second switchable power signal coupled to the telemetry transmitter and the power supply connection. The apparatus may include a controller configured to switch on and off the first switchable power signal and the second switchable power signal. The apparatus may include a power supply coupled to the power supply connection. The power supply may comprise a battery, a solar cell or a vehicle battery. The page receiver, GPS processor and telemetry transmitter may be housed in a housing. The housing may be configured to be installed in a vehicle. The housing may comprise at least a portion of an article of clothing. The housing may be configured to be installed in an object to be tracked. The telemetry transmitter may comprise a cellular telemetry transmitter. The telemetry transmitter may comprise a satellite telemetry transmitter, a cellular telephone, or a radio-telephone. The trigger signal source may comprise a page receiver, the trigger signal activating when the page receiver receives a page. The trigger signal source may comprise an alarm or a remote control.

In general, in another aspect, the invention features a method for reporting a location for an object comprising receiving a page; determining, in response to the page, the location of the object using GPS signals; transmitting the location of the object via telemetry.

Implementations of the invention may include one or more of the following. The method may include applying power to a GPS receiver and a cellular telemetry transmitter upon receipt of the page, and disconnecting power from the GPS receiver and the cellular telemetry transmitter upon transmission of the location of the object. The method may include receiving the transmitted location at a gateway and communicating the transmitted location to a service provider. The method may include transmitting the location of the object via cellular telemetry or via satellite telemetry. The method may include determining if the object is moving and continuing to transmit the location of the object while it is moving. The method may include storing the location of the object and transmitting the stored location of the object if the ability to determine location ceases.

In general, in another aspect, the invention features a triggerable location-reporting apparatus comprising a location-signal generating device and a telemetry transmitter coupled to the location-signal generating device. The apparatus may comprise a GPS processor. The apparatus may comprise a page receiver and a page signal generated by the page receiver and coupled to the GPS processor. The GPS processor may generate the location signal in response to the page signal. Power may be withheld from the GPS processor until the apparatus receives a page. Power may be withheld from the telemetry transmitter until the apparatus receives a page. The telemetry transmitter may comprise a cellular telemetry transmitter or a satellite telemetry transmitter.

BRIEF DESCRIPTION OF THE DRAWINGS

FIG. 5 is a block diagram of the formatter.

FIG. 6 is a representation of the data received from the GPS receiver by the data selector.

FIG. 7 is a representation of the data output from the data selector.

DESCRIPTION OF THE PREFERRED EMBODIMENTS

Figure 1:
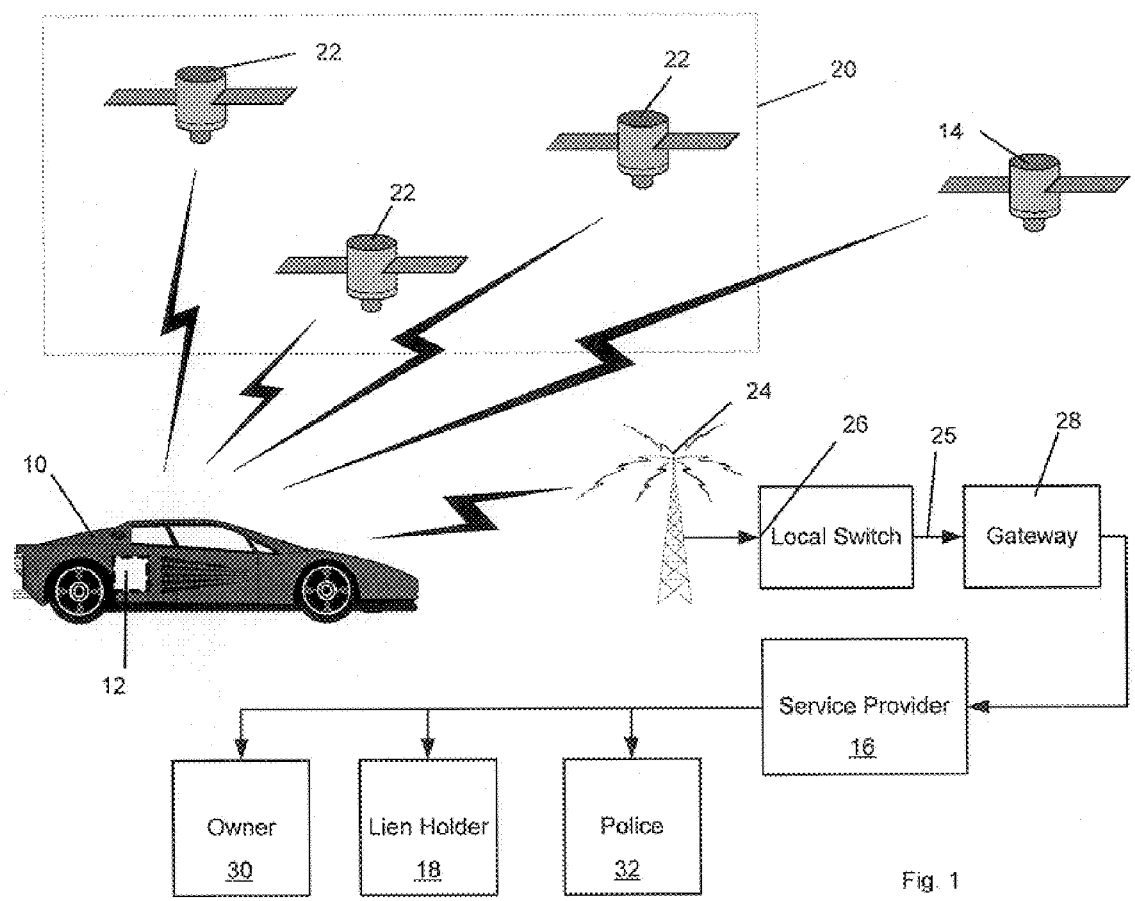
FIG. 1 is a block diagram of a system incorporating one embodiment of the invention.

An object 10, such as an automobile, contains a triggerable location-reporting apparatus 12, as shown in FIG. 1. The apparatus 12 is most likely hidden somewhere in the automobile, and may even be integrated into the body or the engine. For example, the apparatus may be integrated into the automobile's Primary Computer Module. The apparatus can either be connected to the power source associated with the object, such as the automobile battery, or it may have a self-contained power source or sources, as further discussed below.

The apparatus 12 receives a page from the paging satellite 14 preferably initiated by personnel or some automatic device located at the service provider 16. The page request can be initiated from any source. The service provider 16 accepts requests from customers to locate objects that have been lost, stolen or otherwise hidden. For example, a lienholder 18 may request that the service provider 16 locate an object for which the debtor has fallen into default. The service provider's response is to send a page to the apparatus 12.

The page need not originate in the paging satellite 14 but can originate in any system capable of sending out pages. For example, a cellular network may be capable of sending out pages and could be used instead of the paging satellite 14. Further, the system need not use a page to communicate between the service provider 16 and the apparatus 12 but can use any system that allows the service provider 16 to uniquely address the apparatus 12 via a broadcast signal. For example, very low frequency signals or HF radio signals could be used to communicate between the service provider 16 and the apparatus 12.

When the apparatus 12 receives the page it determines its location and direction of movement by accessing the signals of the GPS system 20, which comprises a plurality of satellites 22 broadcasting signals which can be used to determine an object's location and heading anywhere on the earth. The apparatus 12 then formats the location information into a cellular telemetry stream and transmits it via the cellular system's telemetry channels.

In the AMPS (Advanced Mobile Phone System) cellular system, which is the analog cellular system used in the United States, each cellular base station has 832 channels. The 832 channels are divided among at least two competing cellular carriers. Each cellular carrier uses 21 of the 416 channels to carrying control signals. Each control channel includes a Forward Control Channel (FOCC) and a Reverse Control Channel (RECC).

The cellular base station uses the FOCC to send information to cellular telephones and the cellular telephones send information back to the cellular base station via the RECC. The FOCC and RECC are used to establish a cellular telephone call through a local switch. Once the cellular telephone call is established, the call is moved to one of the non-control channels and the released control channel is made available to establish other cellular telephone calls.

The cellular base station broadcasts a System Identification ("SID") signal, which identifies the cellular system to cellular telephones receiving it. When a cellular telephone is turned on, it compares the SID signal it receives against an SID stored within the telephone, which identifies the cellular telephone's home system. If the received SID is not the same as the stored SID, the cellular telephone is "roaming" and the "roam" indicator on the telephone is illuminated.

Subsequently, the cellular telephone transmits its identity to the cellular base station via the RECC. The RECC transmission includes the telephone's Mobile Identification Number ("MIN"), which is a unique 10-digit number (analogous to a telephone number including an area code) that is programmed into the cellular telephone. The first six digits of the MIN identify the cellular telephone's home system. The RECC also includes an Electronic Serial Number ("ESN"), a unique 32-bit serial number permanently stored in the cellular telephone which uniquely identifies the cellular telephone. The cellular base station will receive the MIN and ESN through the RECC and determine that the MIN does not correspond to a local number. Using the MIN, the cellular base station will determine the home system for the cellular telephone and send a validation signal to that system. The cellular local switches in the United States are interconnected through the Intersystem Signaling Network, IS-41, which allows them to send and receive validation information.

The validation signal, known under IS-41 as a RegistrationNotification Invoke (REGNOT) message, includes the cellular telephone's MIN and ESN. The REGNOT message also includes the identity of the cellular base station sending the message. The cellular telephone's home system will respond with a RegistrationNotification Return Result (regnot) message. In the regnot message, the cellular telephone's home system will either indicate that it will take financial responsibility for calls made by the cellular telephone or it will refuse to validate the cellular telephone. If validation occurs, a subsequent exchange of messages establishes the features (such as call forwarding) available to the cellular telephone.

The validation process just described uses the cellular system's control channels. Again, once a cellular telephone call is initiated the control channel that was used to set up the call is released for other purposes.

At least two companies, Cellemetry and Microburst, have developed systems which allow the transmission of information from a cellular telephone to a gateway using the validation signals. Cellemetry, for example, connects a Cellemetry Service Gateway to an IS-41 on a local switch and registers an SID on the IS-41 network. Cellemetry radios transmit RECC signals to local cellular base stations. The local cellular base stations transmit a validation signal to a Cellemetry gateway.

In the RECC signal transmitted from the Cellemetry radio, the MIN normally transmitted in a RECC signal is replaced by a 10-digit equipment identification number, identifying a Cellemetry gateway. The 32-bit ESN normally transmitted can be used as a "payload" to transmit information from the Cellemetry radio or a device incorporating the Cellemetry radio to the Cellemetry gateway. The Cellemetry gateway strips the payload information from the validation signal and sends it to a service provider.

The Microburst system is similar except that the payload is 55 bits instead of 32.

A similar system is used in digital cellular telephone applications such as CDMA and TDMA systems.

Returning to FIG. 1, upon receipt of the page from page satellite 14, the apparatus 12 determines the location and direction of movement, if any, of object 10 using the GPS signals from the GPS system 20. The apparatus then formats the location and movement information into the payload portion of a cellular RECC signal and transmits it to a local cellular base station 24. The MIN portion of the RECC signal may contain a unique MIN or it may be a MIN that is common to all triggerable location-reporting apparatus serviced by a common service provider. Alternatively, the MIN may be different for each of the apparatus.

The cellular base station 24 determines that the apparatus 12 is a roamer and passes a validation signal 25 into the IS-41 system via a local switch 26. The common MIN will cause the cellular base station to direct the validation signal to a gateway 28. The gateway 28 receives the validation signal and reads the payload data and provides it to the service provider 16. The gateway may also use the information regarding the cellular base station that originated the validation signal to determine an approximate location of the cellular telephone and pass that information on to the service provider 16 as well. A company such as Cellemetry or Microburst may provide the gateway or it may be provided by the service provider 16.

The gateway will preferably respond to the cellular base station with a regnot message indicating that the requested roamer status has been denied. The cellular base station will then know not to try to allocate a voice channel to the apparatus. Alternatively, the gateway will not respond to the cellular base station, which will eventually allow the request to expire.

The service provider 16 can now communicate the location of the object 10 to the owner 30, lien-holder 18, or to the police 32.

Figure 2:
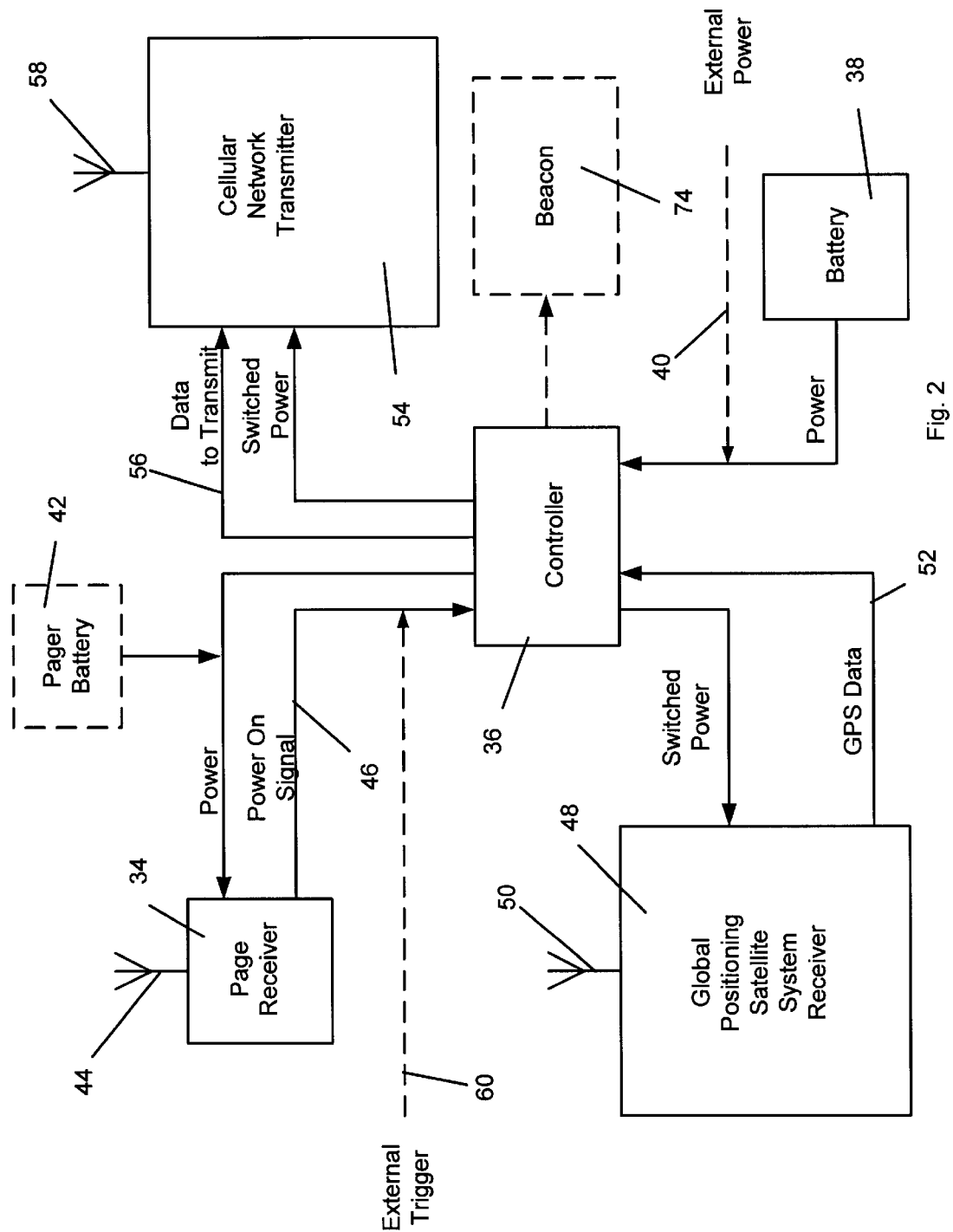
FIG. 2 is a block diagram of one embodiment of the apparatus according to the invention.

A block diagram of the apparatus is shown in FIG. 2. A page receiver 34 receives power through controller 36. Preferably, the power is passed directly through the controller 36. Alternatively, the power may bypass the controller entirely and be applied directly to the page receiver 34. A battery 38 supplies power to the controller 36. Alternatively, an external power source 40 may supply power to the controller 36. As still another alternative, the page receiver 34 may have a pager battery 42 separate from the power supplied to the remaining electronics in the apparatus 12. A separate battery allows the page receiver 34 to remain in a standby state for a long period of time without draining the power supply for the rest of the apparatus.

When the page receiver 34 receives a page over antenna 44 that is addressed to the page receiver 34, the page receiver 34 transmits a "power-on" signal 46 to the controller 36. The controller 36 then switches power to a global position satellite system receiver 48, which receives GPS signals via antenna 50. The GPS receiver 48 acquires the GPS signals and determines a variety of position data regarding apparatus 12. The GPS receiver sends the GPS data 52 to the controller 36.

The controller 36 buffers and reformats the GPS data into a form acceptable to a cellular network transmitter 54. The controller then switches power to the cellular network transmitter and sends a "data to transmit" signal 56 to the cellular network transmitter 54. After the cellular network transmitter has had an opportunity to format the "data to transmit" into the payload section of the RECC signal, the cellular network transmitter 54 transmits the RECC signal, including the GPS payload, via antenna 58. The cellular antenna 58 may be combined with the GPS antenna 50. One or both of these antennas (or their combination) may comprise dielectric and conducting materials embedded in the object or attached to it with an adhesive or some other attachment mechanism.

Preferably, the power-on signal 46 is provided to the controller 36 as the result of a page received by the page receiver 34, as discussed above. Alternatively, an external trigger 60 may provide the power-on indication to the controller 36.

Figure 3:
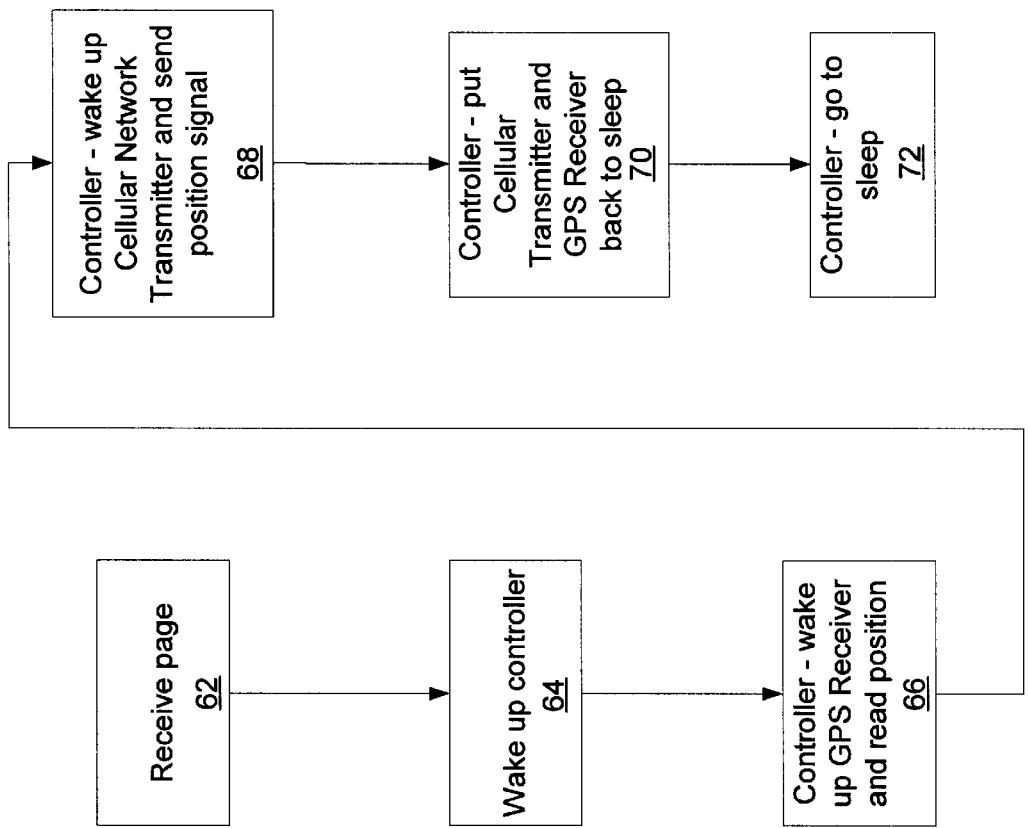
FIG. 3 is a flow chart of the power management feature.

A flow chart of the power management provided by the controller 36 is illustrated in FIG. 3. The apparatus 12 receives a page 62. The page receiver wakes up the controller 64. The controller wakes up the GPS receiver and reads the GPS position information 66. The controller wakes up the cellular network transmitter and sends it formatted position information 68. The transmitter transmits the MIN and the payload to the cellular base station which forwards the data via the RECC transmission to the gateway. The controller then puts the cellular network transmitter and GPS receiver back to sleep 70. The controller then goes back to sleep 72. With this power management approach, significant power is being used only when position information is being transmitted over the cellular network. The rest of the time the only drain on system power is the page receiver, which has a very low power requirement when it is waiting for a page. Even this power drain can be eliminated by using a separate pager battery 42, as shown in FIG. 2.

The controller may store the last location signal it receives from the GPS receiver. Consequently, if the apparatus receives a subsequent page and the GPS receiver cannot perform its function (because, for example, it is shielded from GPS satellite signals), the apparatus will report the stored position. The apparatus may also report the amount of time that has elapsed since the position information was stored.

In another embodiment, the apparatus may turn on a homing beacon 74 (see FIG. 2) if the GPS receiver is unable to perform its function. The homing beacon will allow the object to be tracked by a receiver tuned to the beacon frequency.

Figure 4:
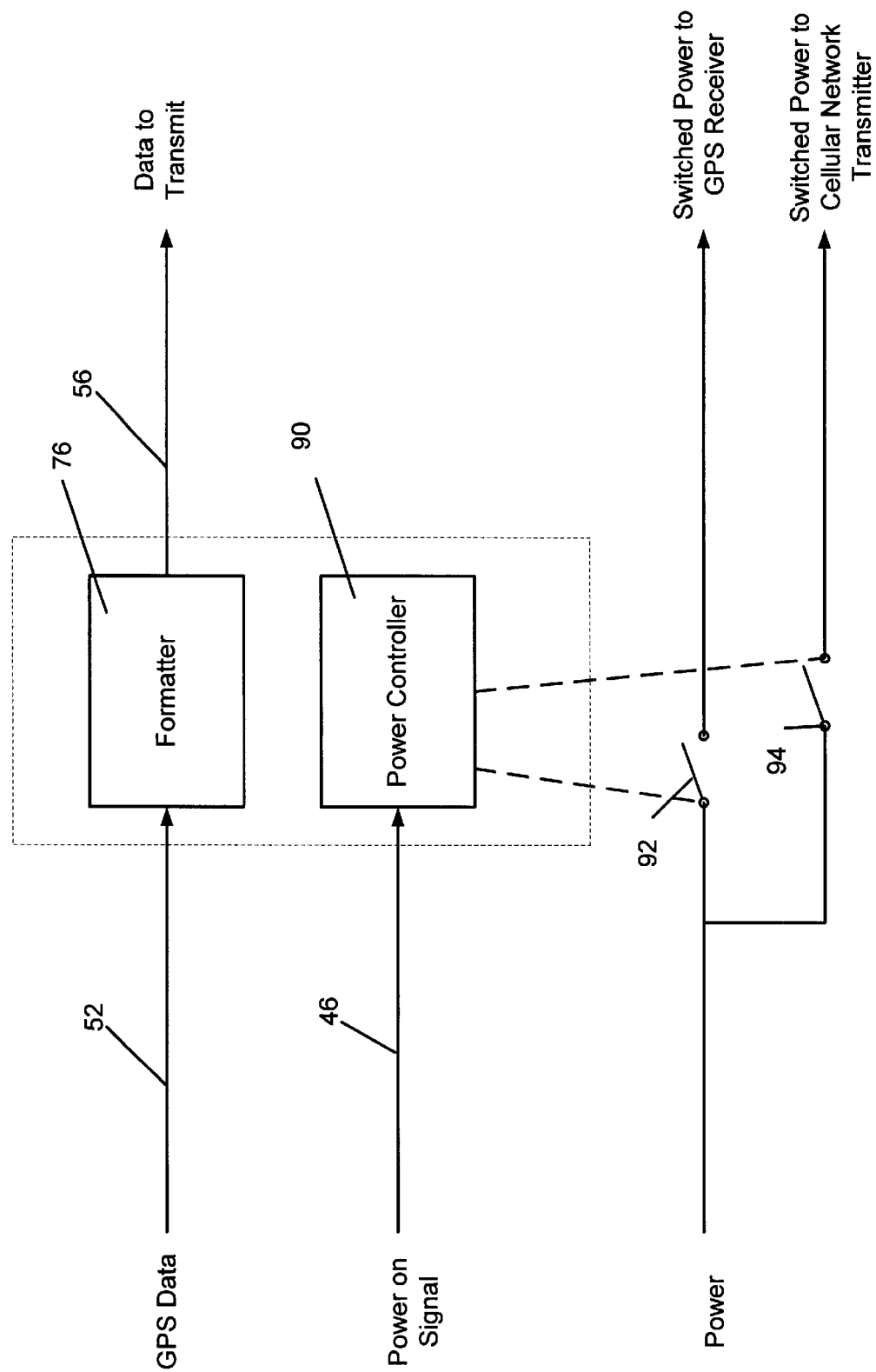
FIG. 4 is a block diagram of the controller.

A block diagram of the controller is shown in FIG. 4. GPS data 52 is received by a formatter 76 from the page receiver 34 where it is buffered and formatted into a form acceptable to the cellular network transmitter 54. The formatter 76 buffers the reformatted signal and then transmits it as a "data to transmit" signal 56.

A block diagram of the data formatter is illustrated in FIG. 5. GPS data 52 is buffered by a buffer 78. A data selector 80 selects data from the buffered GPS data 52 to be transmitted to the cellular network transmitter 54. A buffer and formatter 82 buffer the selected data and convert it into a format acceptable to the cellular network transmitter 54. A memory 84 may be provided to store the last reported position from the GPS receiver. The properly formatted "data to transmit" signal 56 is then transmitted to the cellular network transmitter 54.

An example of the data selector function is illustrated in FIGS. 6 and 7. The Motorola® GT Plus Oncore™ GPS family of chips produces an digital output signal 86 containing bits representing the latitude, longitude, height, velocity, and heading of the apparatus 12 and the current time, as shown in FIG. 6. Similar products manufactured by other companies may be used instead of the Motorola product. Preferably, only the bits representing latitude, longitude, velocity and heading 88 are included in the data to transmit signal 56, as shown in FIG. 7. Preferably, the bits representing height and current time are discarded (although they may be sent in alternative embodiments). Further, it may be desirable to change the order that the various portions of the information are transmitted. For example, it may be desirable to send the heading portion first. The data selector selects the data to be transmitted and arranges it into the desired order.

Returning to FIG. 4, the controller also performs a power management function, as discussed above. Upon receipt of the power-on signal 46 from the page receiver 34, a power controller 90 opens and closes switch 92 to apply and remove power to the GPS receiver 48. The power controller 90 also opens and closes switch 94 to apply and remove power to the cellular network transmitter 54.

Figure 8:
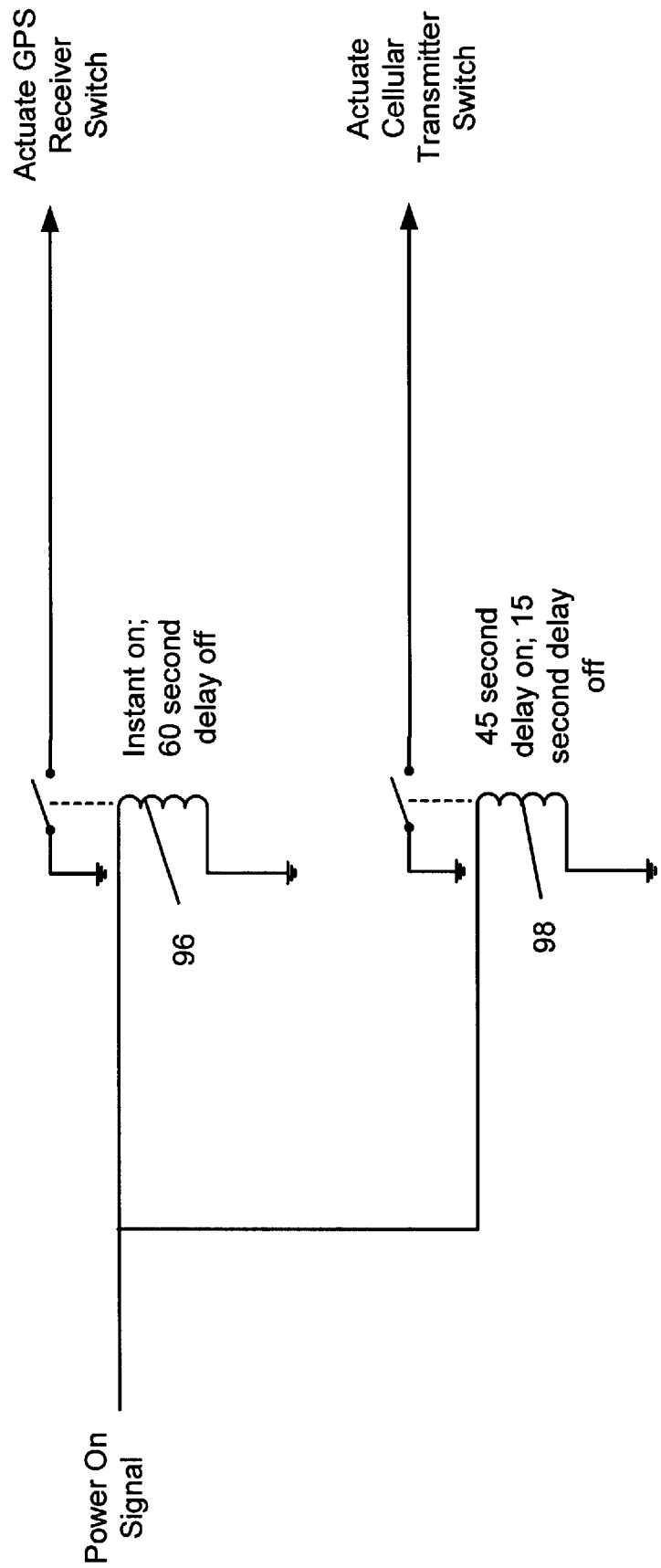
FIG. 8 is a block diagram of the power controller.

A functional block diagram of the power controller is illustrated in FIG. 8. While FIG. 8 shows the use of delayed action relays it should be understood that any electronics that provide the desired function may be used. The power-on signal from the page receiver is applied to two delayed action relays. Relay 96 engages as soon as the power-on signal is applied, which causes switch 92 to close. Sixty seconds later relay 96 disengages, which causes switch 92 to open. The sixty-second power off delay is adjustable as necessary to allow the GPS receiver 48 sufficient on time to acquire the GPS satellites and determine the location of the apparatus.

Relay 98 actuates 45 seconds after the power-on signal is applied. Again, this delay is adjustable so that power is applied to the cellular network transmitter 54 only after the data to transmit signal 56 has been prepared. The cellular network transmitter 54 is turned off 15 seconds after it is turned on, which allows the cellular network transmitter adequate time to transmit the RECC signal to the cellular base station.

The controller may have the ability to determine when the apparatus is moving. It can accomplish this by comparing the location data from the GPS location signal to the location data stored in the memory 84 or by examining the velocity data reported by the GPS receiver. In either case, the controller may leave the GPS receiver power on when the apparatus is moving. The controller can then cause the location data to be reported from time to time (e.g., every five minutes) through the cellular telemetry network by applying power to the cellular network transmitter for a short period of time. The controller may keep the GPS receiver operational for a period of time after the apparatus stops moving. This allows the apparatus to provide continuous updates on its position while it is moving.

Figure 9:
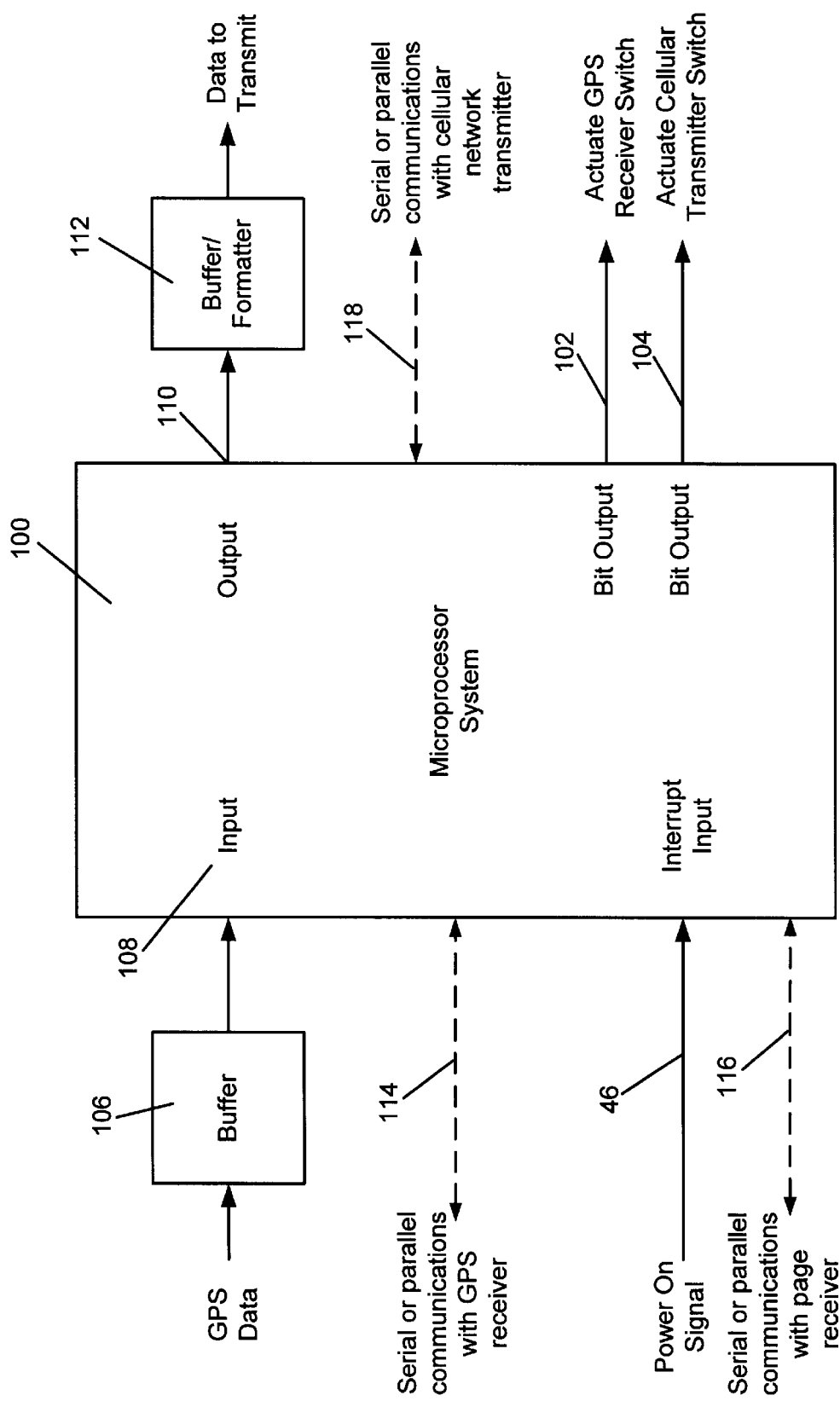
FIG. 9 is a block diagram of an embodiment of the controller.

Another implementation of the elements enclosed in the dashed box in FIG. 4 is shown in FIG. 9. A microprocessor system 100 receives the power-on signal 46 from the page receiver 34. The microprocessor system may include an interconnected microprocessor, program storage area, and data storage area. The storage areas may include random access memory ("RAM") and read only memory ("ROM"). Alternatively, the microprocessor system may be implemented entirely with discrete logic elements or application specific integrated circuits ("ASIC"). The microprocessor system may be implemented with a combination of a microprocessor and discrete and ASIC logic elements.

When the microprocessor receives the power-on signal its stored program causes it to assert and un-assert bit outputs 102 and 104 in sequence, as described above. The program may be developed in assembly language, machine language or a higher order language such as C++ or the function of the program may be accomplished with discrete logic or ASICs or a combination of any of these. Preferably, the program is compiled and linked as necessary and stored in one of the storage areas for execution by the microprocessor to accomplish the described functions.

A buffer 106 receives GPS data 52 from the GPS receiver 48 and buffers it. The microprocessor system 100 extracts the buffered data through input 108, selects the data to be sent out as payload and rearranges it as necessary. The microprocessor system outputs the selected and arranged data through output 110 to a buffer/formatter 112, which formats the "data to transmit" signal 56.

Alternatively, the microprocessor system 100 may communicate with the GPS receiver 48, the page receiver 34 and the cellular network transmitter 54 via serial or parallel communication lines 114, 116, and 118, respectively.

Figure 10:
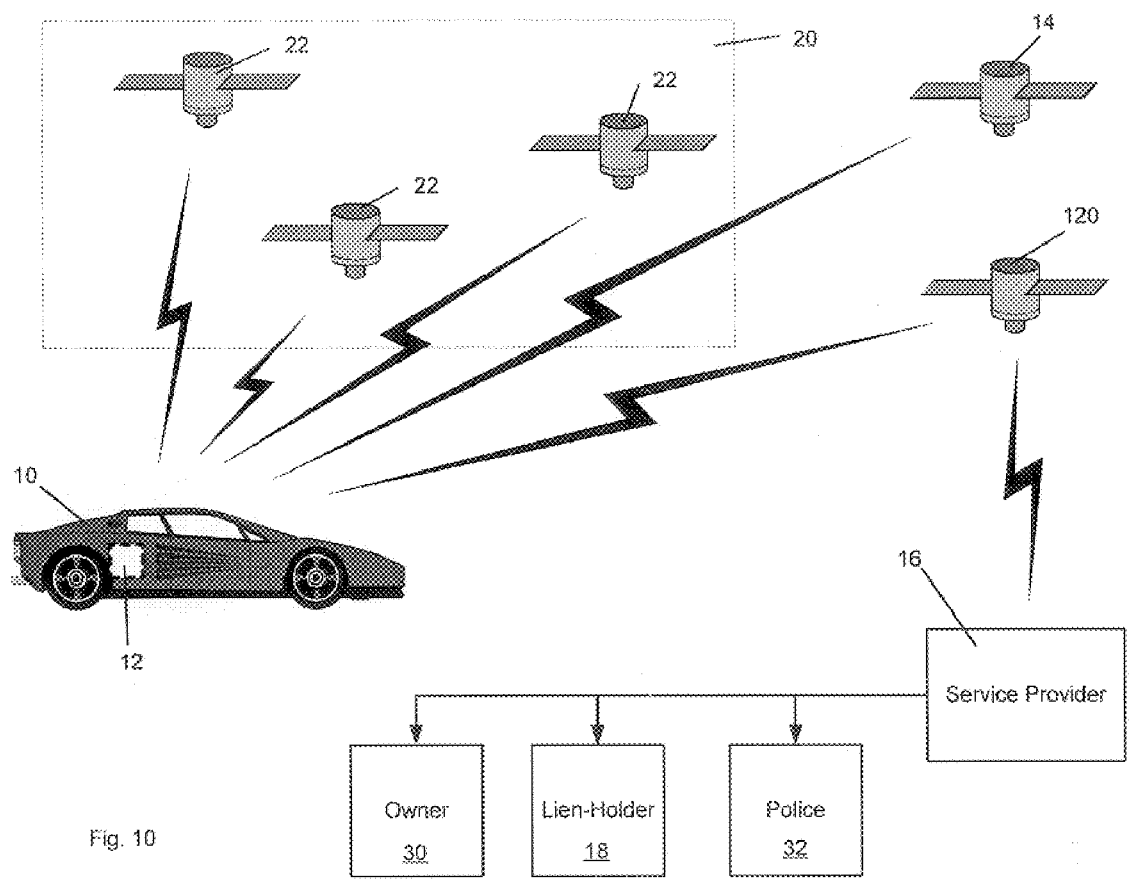
FIG. 10 is a block diagram of an embodiment of a system incorporating the invention.

An alternative embodiment of the system that does not use the cellular network is illustrated in FIG. 10. In this embodiment, the apparatus 12 communicates its location and heading to the service provider 16 through telemetry communications through satellite 120.

In use, for example in the automobile recovery application, a lien-holder would contact the service provider and identify an automobile that the lien-holder wants located. The service provider would cause a page to be sent to the apparatus secured within the automobile. The apparatus would receive the page, ascertain its location using the GPS system, and return the location and heading information to the service provider. The service provider could then tell the lien-holder the location and heading of the automobile. Because of the power management feature described above, the service provider could "track" the automobile as it is being driven, providing the lien-holder with multiple readings regarding the automobile's location. Further, the apparatus may be configured to provide multiple updates of its position while it is moving.

The same function could be supplied with respect to any object, including large-screen televisions, computers or any other item.

Figures 11, 12:
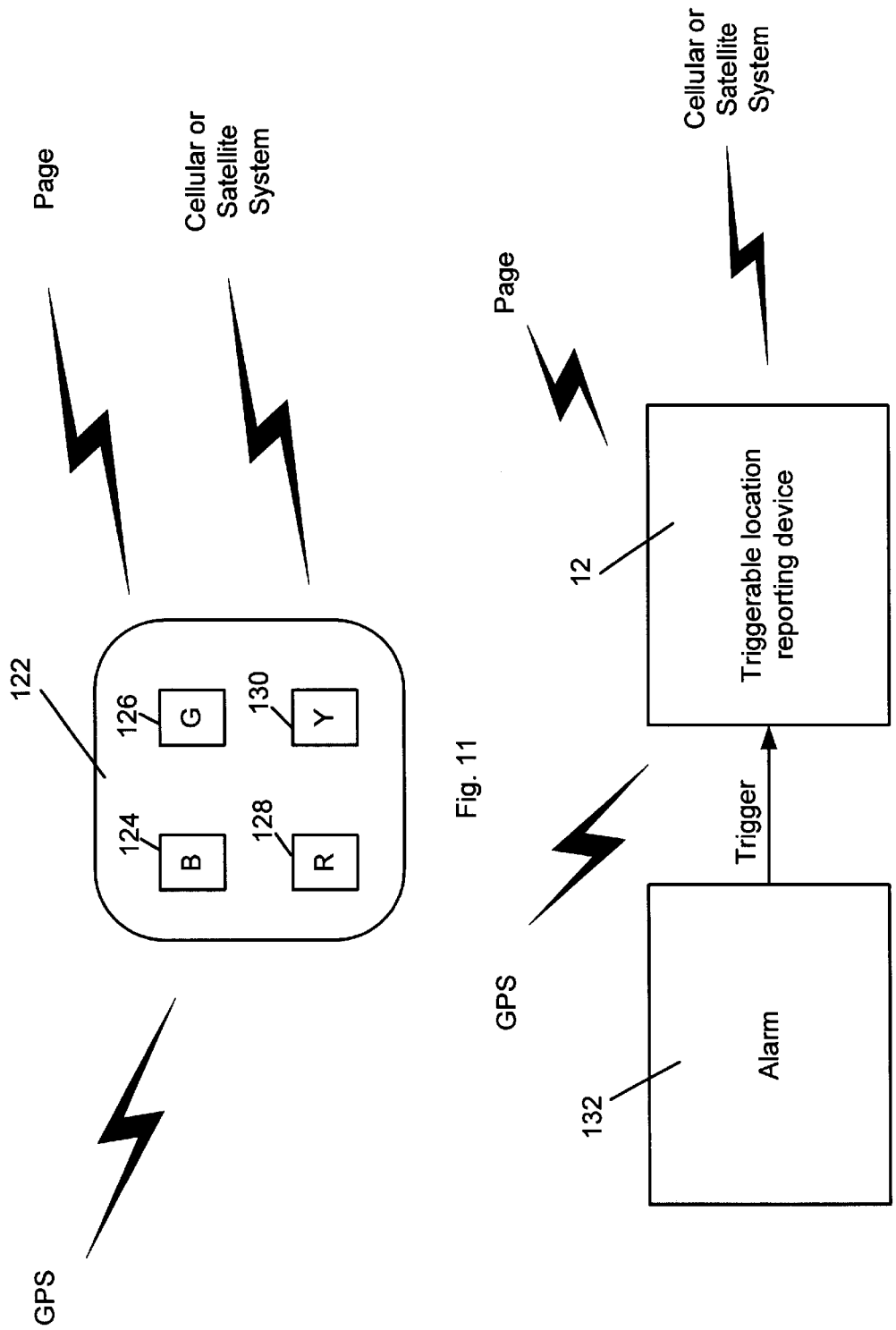
FIG. 11 is a plan drawing of a panic switch according to the present invention.
FIG. 12 is a block diagram of an alternative embodiment of the present invention.

The apparatus could be used to provide a "panic switch" capability, as illustrated in FIG. 11. For example, panic switch 122 includes a blue switch 124, a green switch 126, a red switch 128, and a yellow switch 130. Pressing the switches in the correct order (e.g., red, red, green, yellow) will cause the external trigger 60 (FIG. 2) to actuate, causing the position of the panic switch to be reported to through the system illustrated in FIG. 2 to the police or other agency. The police can then query the apparatus 12 located in the panic switch 122 through the service provider in order to track its location if it is moved.

The apparatus could be adapted to respond to alarm conditions associated with an object, such as the traditional car alarm, as illustrated in FIG. 12. For example, when car alarm 132 is tripped, it actuates external trigger 60 (FIG. 2)

causing the location of the automobile to be reported via the system shown in FIG. 2. Subsequently, the police, the owner or anyone else with the capability can track the automobile through the service provider by sending pages to the apparatus 12.

Figure 13:
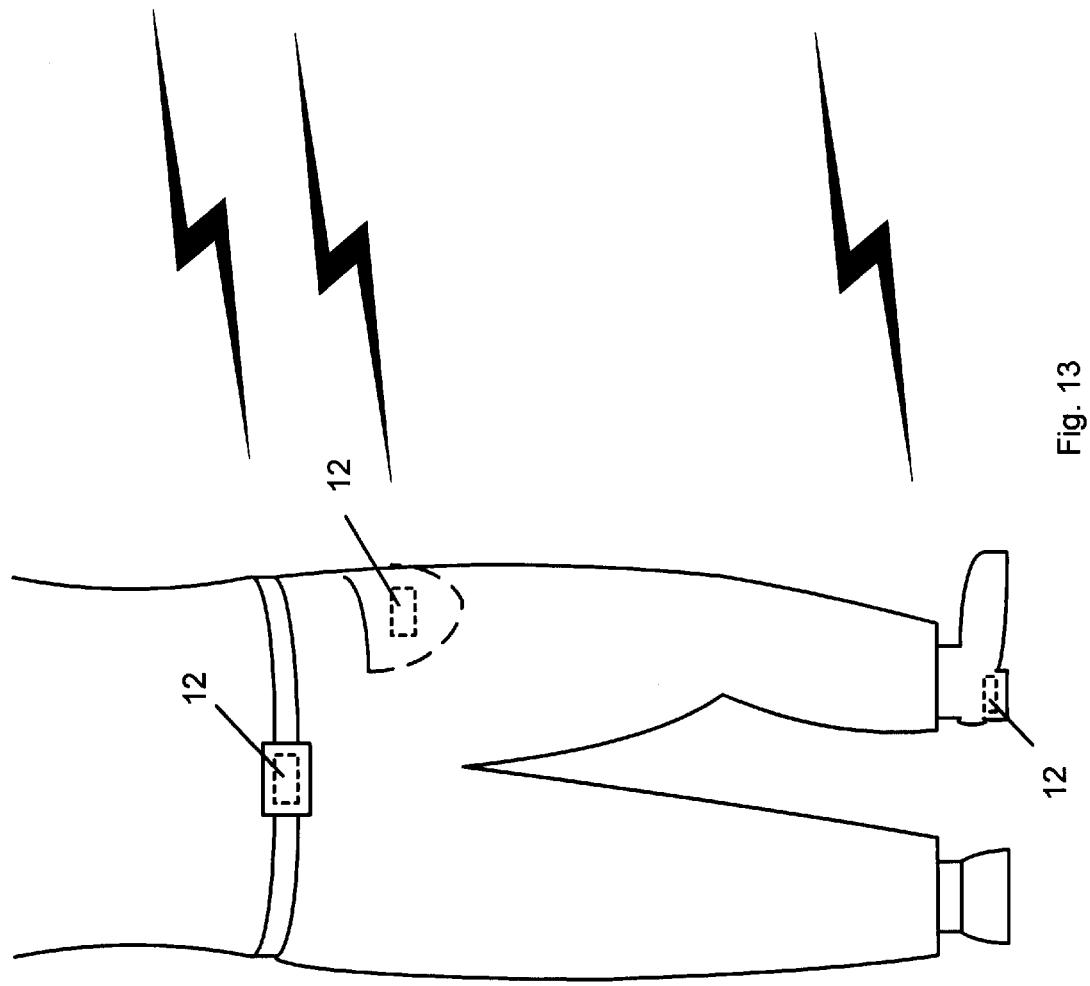
FIG. 13 is a perspective drawing of the invention incorporated in articles of clothing.

The apparatus 12 could be used to locate people, as illustrated in FIG. 13. The apparatus 12 could be hidden in a belt buckle or in the heel of a shoe. Subsequently, if another person became concerned about the location of the person wearing the apparatus, the concerned person could have the service provider page the apparatus 12 and locate and track it as described above.

The foregoing describes preferred embodiments of the invention and is given by way of example only. The invention is not limited to any of the specific features described herein, but includes all variations thereof within the scope of the appended claims.

What is claimed is:

1. A triggerable location-reporting apparatus for use in an environment including: a source of Global Positioning Satellite System (GPS) signals; a source of a trigger signal; a cellular base station connected through a network to a gateway; the cellular base station being configured to expect a Reverse Control Channel signal including a Mobile Identification Number and an Electronic Serial Number, the triggerable location-reporting apparatus comprising:

a GPS receiver responsive to the GPS signals for producing GPS data when enabled;

a data selector for selecting less than all of the GPS data, to produce selected GPS data;

a cellular network transmitter coupled to the data selector for formatting and transmitting, when enabled, a Reverse Control Channel signal including the selected GPS data in the place normally occupied by the Electronic Serial Number and a Mobile Identification Number that will cause the cellular base station to send a Registration Notification Invoke signal including the selected GPS data to the gateway;

a trigger signal receiver responsive to the trigger signal for producing an enable signal;

an enable controller coupled to the GPS receiver, the cellular network transmitter, and the trigger signal receiver;

the enable controller being configured to enable the GPS receiver and the cellular network transmitter upon receipt of the enable signal from the trigger signal receiver; and the enable controller being configured to disable the GPS receiver and the cellular network transmitter;

wherein the data selector reorders the selected GPS data.

2. A method for reporting a location for an object in an environment including: a source of Global Positioning Satellite System (GPS) signals; a source of a trigger; a cellular base station connected through a network to a gateway; the cellular base station being configured to expect a Reverse Control Channel signal including a Mobile Identification Number and an Electronic Serial Number, the method comprising:

receiving a trigger;

enabling, in response to the trigger, a GPS receiver responsive to the GPS signals to produce GPS data;

selecting less than all of the GPS data to produce selected GPS data;

enabling, in response to the trigger, a cellular network transmitter to format and transmit a Reverse Control Channel signal including the selected GPS data in the place normally occupied by the Electronic Serial Number and a Mobile Identification Number that will cause the cellular base station to send a Registration Notification Invoke signal including the selected GPS data to the gateway; and disabling the GPS receiver and the cellular network transmitter;

wherein the selecting further includes reordering the selected GPS data.

3. A triggerable location-reporting apparatus comprising:

a location-signal generating device configured to produce a location signal including location data when enabled;

a data selecting device for selecting less than all of the location data to include in the location signal;

a telemetry transmitter coupled to the data selecting device configured to transmit the location signal when enabled; and an enable controller configured to enable the location-signal generating device and the telemetry transmitter when it receives a trigger signal and to disable the location-signal generating device and the telemetry transmitter after the telemetry transmitter transmits the location signal;

wherein the data selecting device reorders the selected location data.

* * * * *

(12) EX PARTE REEXAMINATION CERTIFICATE (7062nd)
United States Patent
Allen, Jr.

(10) Number: US 6,484,035 C1
(45) Certificate Issued: Sep. 15, 2009

(54) APPARATUS AND METHOD FOR TRIGGERABLE LOCATION REPORTING

(75) Inventor: Alvin C. Allen, Jr., Liberty, TX (US)

(73) Assignee: Lunareye, Inc., Liberty, TX (US)

Reexamination Request:
No. 90/008,858, Sep. 28, 2007

Reexamination Certificate for:
Patent No.: 6,484,035
Issued: Nov. 19, 2002
Appl. No.: 10/008,893
Filed: Nov. 13, 2001

Related U.S. Application Data

(63) Continuation of application No. 09/206,627, filed on Dec. 7, 1998, now abandoned.

(51) Int. Cl.
*G01S 5/14* (2006.01)
*G01S 5/00* (2006.01)

(52) U.S. Cl. .......... 455/456.1; 455/12.1; 455/517; 340/825.49; 340/988; 342/357.07; 342/357.1; 342/457

(58) Field of Classification Search .......... None
See application file for complete search history.

(56) References Cited

U.S. PATENT DOCUMENTS

| | | |
|---|---|---|
| 4,578,678 A | 3/1986 | Hurd |
| 4,667,203 A | 5/1987 | Counselman, III |
| 4,800,577 A | 1/1989 | Tachita et al. |
| 4,837,700 A | 6/1989 | Ando et al. |
| 4,870,422 A | 9/1989 | Counselman, III |
| 5,043,736 A | 8/1991 | Darnell et al. |
| 5,210,540 A | 5/1993 | Masumoto |
| 5,222,245 A | 6/1993 | Ando et al. |
| 5,257,195 A | 10/1993 | Hirata |
| 5,311,197 A | 5/1994 | Sorden et al. |
| 5,323,152 A | 6/1994 | Morita |
| 5,365,451 A | 11/1994 | Wang et al. |
| 5,375,059 A | 12/1994 | Hyrtsos et al. |
| 5,390,125 A | 2/1995 | Sennott et al. |
| 5,398,190 A | 3/1995 | Wortham |
| 5,430,654 A | 7/1995 | Kyrtsos et al. |
| 5,438,517 A | 8/1995 | Sennott et al. |
| 5,442,558 A | 8/1995 | Kyrtsos et al. |
| 5,495,257 A | 2/1996 | Loomis |
| 5,525,999 A | 6/1996 | King et al. |
| RE35,498 E | 4/1997 | Barnard |
| 5,636,122 A | 6/1997 | Shah et al. |
| 5,650,785 A | 7/1997 | Rodal |
| 5,663,734 A | 9/1997 | Krasner |
| 5,669,061 A | 9/1997 | Schipper |
| 5,680,140 A | 10/1997 | Loomis |
| 5,682,139 A | 10/1997 | Pradeep et al. |
| 5,712,899 A | 1/1998 | Pace, II |
| 5,742,233 A | 4/1998 | Hoffman et al. |
| 5,742,509 A | 4/1998 | Goldberg et al. |
| 5,748,144 A | 5/1998 | Rodal |
| 5,777,580 A | 7/1998 | Janky et al. |
| 5,825,328 A | 10/1998 | Schipper et al. |
| 5,918,180 A | 6/1999 | Dimino |
| 6,131,067 A | 10/2000 | Girerd et al. |
| 6,308,134 B1 | 10/2001 | Croyle et al. |
| 6,677,894 B2 | 1/2004 | Sheynblat et al. |
| 6,816,710 B2 | 11/2004 | Krasner |

OTHER PUBLICATIONS

E. Lawrey, "The Suitability of OFDM as a Modulation Technique for Wireless Telecommunications, with a CDMA Comparison" (Oct. 18, 1997) (published thesis, James Cook University).

T. Keller, L. Hanzo, "Orthogonal Frequency Division Multiplex Synchronisation Techniques for Wireless Local Area Networks", IEEE International Symposium on Personal, Indoor and Mobile Radio Communications, vol. 3, Oct. 15, 1996, pp. 963–967.

*Primary Examiner*—Charles Craver

(57) ABSTRACT

A triggerable location-reporting apparatus is disclosed. A trigger signal from a page receiver triggers a GPS receiver to determine the location of the apparatus using GPS signals. The resulting GPS signal is transmitted by a telemetry transmitter, such as a cellular network telemetry transmitter.

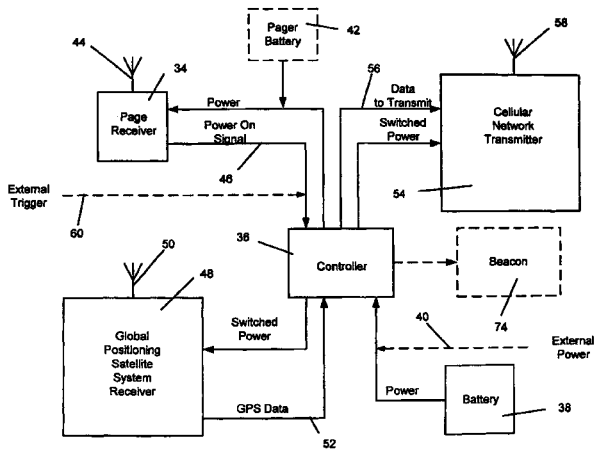

EX PARTE REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

The patentability of claim 3 is confirmed.

New claims 4-24 are added and determined to be patentable.

Claims 1 and 2 were not reexamined.

4. *A triggerable location-reporting apparatus comprising:*
   *a location-signal generating device configured to produce a location signal including derived location data when enabled;*
   *a data selecting device for selecting less than all of the derived location data to include in the location signal;*
   *a telemetry transmitter coupled to the data selecting device configured to transmit the location signal when enabled; and*
   *an enable controller configured to enable the location-signal generating device and the telemetry transmitter when the controller receives a trigger signal and to disable the location-signal generating device and the telemetry transmitter after the telemetry transmitter transmits the location signal;*
   *wherein the data selecting device reorders the selected location data.*

5. *The apparatus of claim 4, wherein disable the location-signal generating device and the telemetry transmitter after the telemetry transmitter transmits the location signal comprises powering down the location-signal generating device and the telemetry transmitter.*

6. *The apparatus of claim 4, wherein the transmitted location signal comprises the reordered, selected location data.*

7. *The apparatus of claim 4, wherein the selected location data is selected after the location data is derived from GPS data.*

8. *The apparatus of claim 4, wherein the location data includes one or more of latitude, longtitude, height, time, velocity, heading, or any combination thereof.*

9. *The apparatus of claim 7, wherein the location data includes latitude, longitude, velocity, and heading.*

10. *A triggerable location-reporting apparatus comprising:*
    *a location-signal generating device configured to produce a location signal including location data when enabled;*
    *a data selecting device for discarding at least a portion of the location data from the location signal, wherein the data selecting device reorders the location data of the signal after discarding at least a portion of the location data therefrom;*
    *a telemetry transmitter coupled to the data selecting device configured to transmit the location signal comprising the reordered location data, when enabled; and*
    *an enable controller configured to enable the location-signal generating device and the telemetry transmitter when the controller receives a trigger signal and to disable the location-signal generating device and the telemetry transmitter after the telemetry transmitter transmits the location signal comprising the reordered location data.*

11. *The apparatus of claim 10, wherein disable the location-signal generating device and the telemetry transmitter after the telemetry transmitter transmits the location signal comprises powering down the location-signal generating device and the telemetry transmitter.*

12. *The apparatus of claim 10, wherein the discarded location data is discarded after the location data is derived from GPS data.*

13. *The apparatus of claim 10, wherein the location data comprises latitude, longitude, height, time, velocity, and heading.*

14. *The apparatus of claim 10, wherein the discarded location data includes height and time.*

15. *The apparatus of claim 10, wherein the discarded location data is height.*

16. *The apparatus of claim 10, wherein the discarded location data is time.*

17. *A triggerable location-reporting apparatus comprising:*
    *a location-signal generating device configured to produce a location signal comprising location components selected from the group consisting of latitude, longitude, height, velocity, heading, and time, when enabled;*
    *a data selecting device for selecting location components and reordering the selected location components;*
    *a telemetry transmitter coupled to the data selecting device configured to transmit a location signal comprising the selected and reordered location components, when enabled; and*
    *an enable controller configured to power up the location-signal generating device and the telemetry transmitter when the enable controller receives a trigger signal and power down the location-signal generating device and the telemetry transmitter after the telemetry transmitter transmits the location signal comprising the selected and reordered location components.*

18. *The apparatus of claim 17, wherein the location components are derived from GPS data.*

19. *The apparatus of claim 18, wherein the selected location components include latitude, longitude, velocity, heading, or any combination thereof.*

20. *The apparatus of claim 18, wherein the data selecting device discards at least a portion of the location components derived from raw GPS data, leaving the selected and reordered location components to be transmitted.*

21. *The apparatus of claim 3, wherein the data selecting device reorders the selected location data comprises rearranging the location data.*

22. *The apparatus of claim 4, wherein the data selecting device reorders the selected location data comprises rearranging the location data.*

23. *The apparatus of claim 10, wherein the data selecting device reorders the location data comprises rearranging the location data.*

24. *The apparatus of claim 17, wherein reordering the selected location components comprises rearranging the location data.*

* * * * *